US011841316B2

(12) United States Patent
Lavania et al.

(10) Patent No.: US 11,841,316 B2
(45) Date of Patent: Dec. 12, 2023

(54) MECHANISM FOR ALIGNING AND ORIENTING A PROBE IN AN OPTICAL SYSTEM

(71) Applicants: Anupam Lavania, Gujarat (IN); Shilpa Malik, Gujarat (IN)

(72) Inventors: Anupam Lavania, Gujarat (IN); Shilpa Malik, Gujarat (IN)

(*) Notice: Subject to any disclaimer, the term of this patent is extended or adjusted under 35 U.S.C. 154(b) by 0 days.

(21) Appl. No.: 17/276,685

(22) PCT Filed: Sep. 17, 2019

(86) PCT No.: PCT/IB2019/057807
§ 371 (c)(1),
(2) Date: Mar. 16, 2021

(87) PCT Pub. No.: WO2020/058840
PCT Pub. Date: Mar. 26, 2020

(65) Prior Publication Data
US 2022/0026348 A1    Jan. 27, 2022

(30) Foreign Application Priority Data
Sep. 17, 2018   (IN) .............................. 201821034979

(51) Int. Cl.
*G01N 21/25*   (2006.01)
(52) U.S. Cl.
CPC ... *G01N 21/255* (2013.01); *G01N 2201/0224* (2013.01)
(58) Field of Classification Search
CPC ........ G01Q 30/06; G01Q 70/00; G01Q 70/02; Y10S 977/85; G02B 6/36–406;
(Continued)

(56) References Cited

U.S. PATENT DOCUMENTS 5,705,814 A * 1/1998 Young ................... G01Q 30/06
250/423 P
7,183,759 B1 * 2/2007 Malendevich ........... G02B 6/34
324/762.05
(Continued)

FOREIGN PATENT DOCUMENTS

JP         2001500958 A      1/2001
WO   WO-2013148204 A1 * 10/2013   ............... G01N 3/04

OTHER PUBLICATIONS

International Search Report and Written Opinion, International Patent Application No. PCT/IB2019/057807, dated Dec. 30, 2019 (9 pages).

*Primary Examiner* — Tarifur R Chowdhury
*Assistant Examiner* — Roberto Fabian, Jr.
(74) *Attorney, Agent, or Firm* — Hamre, Schumann, Mueller & Larson, P.C.

(57) ABSTRACT

The present disclosure discloses a mechanism for aligning and orienting a probe in an optical system. The mechanism includes a sensor head, which are defined with one or more provisions. Further, the mechanism includes at least one block member, which is movably disposed within the one or more provisions in the sensor head. The at least one block member is defined with a cavity to accommodate a probe. During contact of the probe with a surface of the subject, a torque is generated, which facilitates in aligning the probe on the surface of the subject. The block member is configured to tilt corresponding to movement of the probe, for aligning the probe at an angle on the surface of the subject.

12 Claims, 6 Drawing Sheets

(58) Field of Classification Search
CPC .......... G01N 21/255; G01N 2201/0224; G01J 3/0218; G01J 3/42; G01J 3/0202
See application file for complete search history.

(56) References Cited

U.S. PATENT DOCUMENTS

| | | | |
|---|---|---|---|
| 8,020,308 B2 * | 9/2011 | Lee | G01B 21/20 |
| | | | 33/503 |
| 9,372,203 B1 * | 6/2016 | Massie | G01Q 70/02 |
| 2015/0338439 A1 * | 11/2015 | Saunin | G01Q 60/18 |
| | | | 850/30 |
| 2017/0292823 A1 * | 10/2017 | Mies | G01B 5/28 |

\* cited by examiner

MECHANISM FOR ALIGNING AND ORIENTING A PROBE IN AN OPTICAL SYSTEM

TECHNICAL FIELD

Present disclosure generally relates to a field of optics and optical systems. Particularly but not exclusively, the present disclosure relates to the optical system, that contacts a surface of a subject for but not limiting to examination of the subject. Further, embodiments of the disclosure, disclose a mechanism for aligning and orienting a probe in the optical system, on a surface of the subject.

BACKGROUND

Diffuse reflectance spectroscopy is a technique of imaging and analyzing a scattered beam or radiation to determine different characteristics of a test subject. Generally, systems or devices used for diffuse reflectance spectroscopy includes a plurality of optical fiber probes. The plurality of optical fibers may be integrated with sources for emitting radiation of desired frequency onto a surface of the subject, and detectors for receiving reflected or scattered radiations from the surface of the test subject i.e. the subject altered radiations. Further, the radiations received by the detectors, may be analyzed to determine different characteristics of the test subject's surface or matter underneath the surface.

For efficient examination of the subject, the optical fiber probes integrated with the source and detectors are to be positioned at desired angle, may be normal to the surface of the subject. Also, in order to ensure perfect contact with the surface of the subject, positioning the probe at desired angle plays a key role, irrespective of irregularities on the surface of the subject. This positioning enhances optical coupling efficiency of the photons or light, incident on the surface of the subject.

In conventional reflectance spectroscopy systems, the optical fiber probes may not be positioned at the desired angle and, may have minimal contact or no contact with the surface of the subject, due to irregularities on the surface of the subject. Due to non-contact or minimal contact of the probe with the surface of the subject, air pockets or air gaps may be created between a tip of the plurality of the probes and surface of the subject, which may lead to photon losses, such as Fresnel losses. Fresnel losses in the spectroscopy system, reduces both the number of photons incident on to the surface and number of photons reflected from the surface, thus leading to ineffective or inefficient analysis of the subject. Further, the optical fiber probes, which are terminated or connected in bare fiber, would result in Fresnel losses, since the bare fibers are fragile and may even undergo bending, which may lead to change in angle of incidence with the surface of the subject. Also, the optical fiber probes terminated or connected in bare fibers, may break or fracture due to application of excess external pressure, which is undesirable in the reflectance spectroscopy system.

With the advancement in the technology, passive probes are used in the reflectance spectroscopy systems, to meet or align with the curvatures or undulations on the surface of the test subject. However, passive probes are inflexible in nature and may not adjust to orient themselves to align with the curvature or undulations of the surface.

The present disclosure is directed to overcome one or more limitations stated above and any other limitations associated with the conventional systems.

The information disclosed in this background of the disclosure section is only for enhancement of understanding of the general background of the invention and should not be taken as an acknowledgment or any form of suggestion that this information forms the prior art already known to a person skilled in the art.

SUMMARY

One or more shortcomings of conventional assemblies and processes are overcome, and additional advantages are provided through mechanism and system claimed in the present disclosure. Additional features and advantages are realized through the techniques of the present disclosure. Other embodiments and aspects of the disclosure are described in detail herein and are considered a part of the claimed disclosure.

In a non-limiting embodiment of the present disclosure, a mechanism for aligning a probe of an optical system, on a surface of a subject is disclosed. The mechanism comprises a sensor head, which is defined with one or more provisions. Further, the mechanism comprises at least one block member, which is movably disposed in each of the one or more provisions. The at least one block member is defined with a cavity to accommodate the probe. During operation, when the probe contacts the surface of the subject, torque is generated for aligning the probe on the surface of the subject. Also, the at least block member is configured to tilt, corresponding to movement of the probe, to facilitate in aligning the probe at an angle with respect to the surface of the subject.

In an embodiment, the least one block member is movably connected to the sensor head by at least one of one or more deformable members and a hinge.

In an embodiment, the one or more deformable members is connected between the at least one block member and a portion of the sensor head.

In an embodiment, the hinge is connected between a side wall of the one or more provisions, and the at least one block member.

In an embodiment, the one or more deformable members, is at least one of a helical spring, coil spring, hydraulic spring and pneumatic spring.

In an embodiment, the probe accommodated within the at least one block member is positioned at an angle to the sensor head.

In an embodiment, the probe accommodated within the at least one block member is positioned normal to the sensor head.

In an embodiment, the tip of the probe is defined with at least one of a flat profile and a disc profile.

In an embodiment, side wall of the one or more provisions are configured to exert lateral reaction forces to the at least one block member, for restricting lateral and angular movement of the at least one block member, for limiting the angle of tilt of the probe on the surface of the subject.

In an embodiment, geometrical shape of the side wall of the one or more provisions is at least one of a stepped, cubical, conical, frustum and cuboidal shape.

In an embodiment, wherein geometrical shape of the at least one block member corresponds to the geometrical shape of the side wall.

In another non-limiting embodiment of the present disclosure, an optical system is disclosed. The optical system comprises a enclosure and a sensor head coupled to the enclosure. Further, the optical system comprises a plurality of probes positioned within the enclosure. Each of the plurality of probes are aligned on a surface of a subject at an angle, by a mechanism disposed in the sensor head. The mechanism comprises at least one block member, which is movably disposed in each of the one or more provisions defined in the sensor head, and is defined with a cavity to accommodate the probe. During operation, when the probe contacts the surface of the subject, torque is generated for aligning the probe on the surface of the subject. Also, the at least one block member is configured to tilt, corresponding to movement of the probe, to facilitate in aligning the probe at an angle with respect to the surface of the subject.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the detailed disclosure. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

While the embodiments in the disclosure are subject to various modifications and alternative forms, specific embodiment thereof has been shown by way of example in the figures and will be described below. It should be understood, however, that it is not intended to limit the disclosure to the particular forms disclosed, but on the contrary, the disclosure is to cover all modifications, equivalents, and alternatives falling within the scope of the disclosure.

It is to be noted that a person skilled in the art would be motivated from the present disclosure and modify various aspects of the mechanism. However, such modifications should be construed within the scope of the disclosure. Accordingly, the drawings show only those specific details that are pertinent to understand the embodiments of the present disclosure, so as not to obscure the disclosure with details that will be readily apparent to those of ordinary skill in the art having benefit of the description herein.

The terms "comprises", "comprising", or any other variations thereof used in the disclosure, are intended to cover a non-exclusive inclusion, such that a device, system, assembly that comprises a list of components does not include only those components but may include other components not expressly listed or inherent to such system, or assembly, or device. In other words, one or more elements in a system or device proceeded by "comprises . . . a" does not, without more constraints, preclude the existence of other elements or additional elements in the system or device.

Embodiments of the present disclosure discloses a mechanism for aligning and orienting a probe, employed in an optical system such as, but not limiting to diffuse reflectance spectroscopy system. In conventional optical systems, the probes in the optical system may not align at a desired angle on a surface of the subject or some of the probes may not even contact the surface of the subject, when encountered with irregularities on the surface of the subject. This non-contact or misalignment of the probes with the surface of the subject may generate air pockets or air gaps between a tip of the probe and the surface of the subject. This may lead to losses such as Fresnel losses, which results in operational errors of the optical system, which is undesirable. The present disclosure is directed to a mechanism to align and orient the probe at a desired angle on the surface of the subject, to make hermetic contact of the probe with the surface of the subject, in order to mitigate operational errors.

The mechanism of the present disclosure may be adapted for aligning and orienting a probe in an optical system. The mechanism may include a sensor head, which may be defined with one or more provisions. Further, the mechanism may include at least one block member, which may be defined with a cavity to accommodate a probe. The at least one block member may be movably disposed in each of the one or more provisions, defined in the sensor head. Furthermore, the mechanism may include at least one of one or more deformable members and a hinge, which may be configured to connect the at least one block member and the sensor head. At least one of the one or more deformable members and the hinge may facilitate in assisting tilting of the at least one block member in a direction corresponding to the orientation of the probe on the surface of the subject during alignment. In an embodiment, walls of the one or more provisions may be configured to exert lateral reaction forces to the at least one block member, for limiting the tilt of the at least one block member, based on desired aligning angle of the probe with the surface of the subject.

In an embodiment, during operation of the optical system, a force may be applied by the operator onto the probe in the optical system, at certain angle with respect to the surface of the subject. This force may be applied in order to accomplish contact of a tip of the probe with the surface of the subject. This contact of a tip of the probe with the surface of the subject, may result in generation of a normal reaction force, perpendicular to the surface at the point of contact of the tip. The normal reaction force generated, is at a distance away or at a different angle from an axis of the force applied, due to at least one of irregularities on the surface of the subject or difference in orientation of the probe or may be normal to the subject at the point of contact. Due to a shift or offset in the axis of direction of the force applied and the reaction force generated, an angular moment may be induced at the tip of the probe. In other words, a torque may be generated at the tip of the probe, due to change in angular moment, as a result of application of force by the operator. In order to counter the angular moment or the torque generated, the probe (thus, the tip of the probe) may orient or tilt by shifting the point of contact on the surface of the subject. During aligning of the probe i.e. tilting of the probe on the surface of the subject, the at least one block member may tilt corresponding to the direction of orientation (thus, tilting) of the probe on the surface, to facilitate aligning of the probe at an angle on the surface of the subject. In an embodiment, during tilting of the at least one block member, the one or more deformable members may undergo compression/expansion, and thus may assist in tilting of the block member. Further, during tilting of the at least block member, the block member may engage with the side wall of the one or more provisions. This engagement, limits the tilt of the at least one block member and thus, facilitates in aligning the probe at desired angle on the surface of the subject.

In the following description of the embodiments of the disclosure, reference is made to the accompanying figures that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
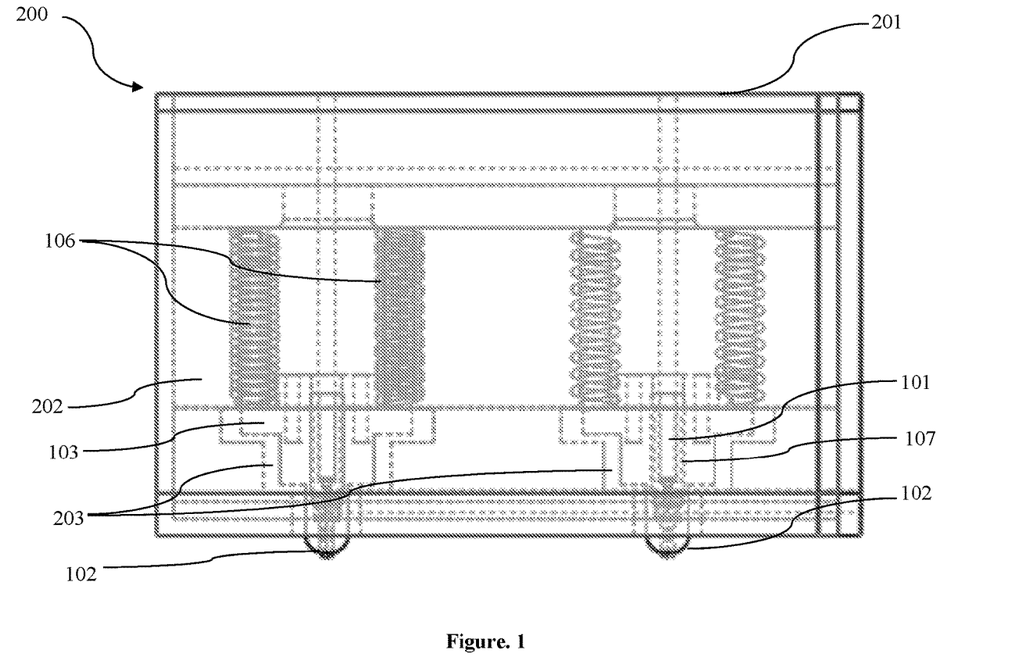
FIG. 1 illustrates a schematic sectional view of an optical system, in accordance with an exemplary embodiment of the present disclosure.

FIG. 1 is an exemplary embodiment of the disclosure which, illustrates a schematic sectional view of an optical system (200). The optical system (200) may include a enclosure (201). In an embodiment, the enclosure (201) may facilitate in accommodating various electronic and mechanical components of the optical system (200). Further, the optical system (200) may include a plurality of probes (101), positioned within the enclosure (201). In an embodiment, the optical system (200) may include a sensor head (202). The sensor head (202) may be coupled to the enclosure (201) or the sensor head (202) may form an integral part of the enclosure (201). In an embodiment, the sensor head (202) may be configured to accommodate a mechanism (100), which may be associated with each of the plurality of probes (101). The mechanism (100) may facilitate in aligning and orienting the probe (101) at an angle on the surface (104) of the subject (105), in order to establish hermetic contact of the probe (101) with the surface (104) of the subject (105), for efficient analysis of the subject's surface or matter underneath the subject's surface (105). In an embodiment, the plurality of probes (101) in the optical system (200) may be integrated with sources and detectors, for transmitting and analyzing the light, respectively.

Figure 2:
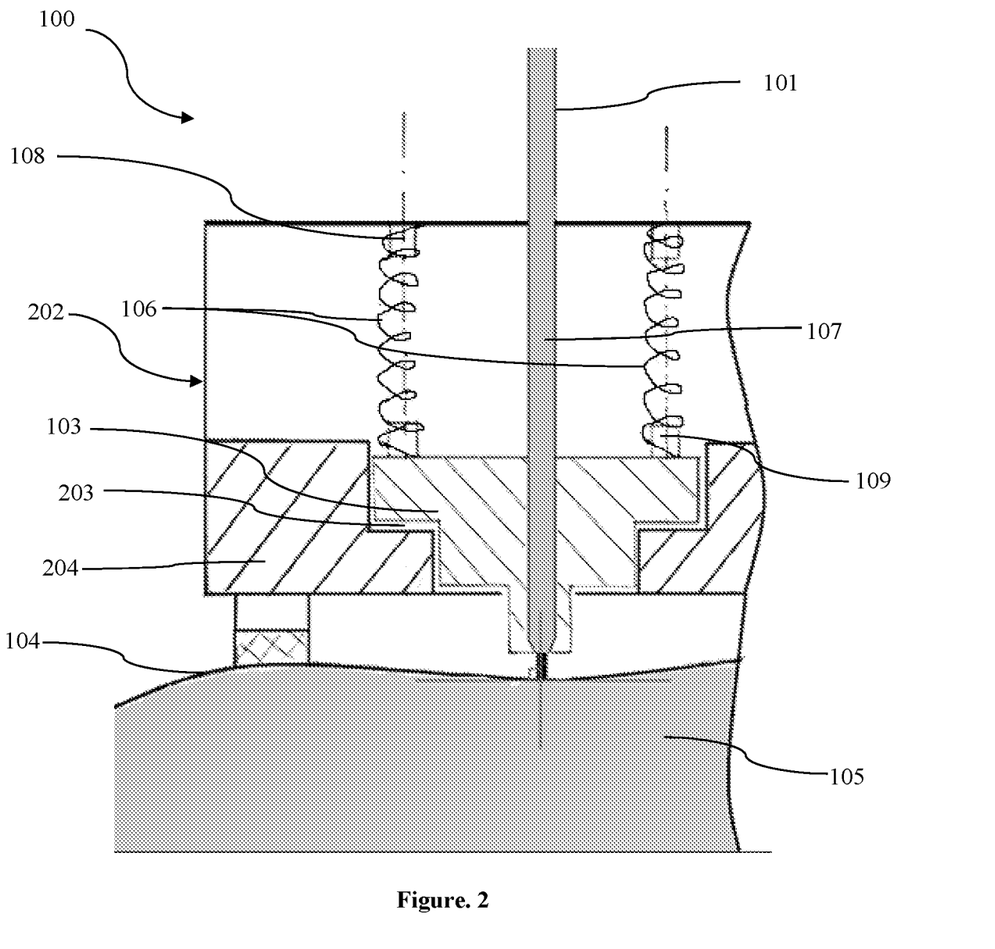
FIG. 2 illustrates a sectional view of a mechanism for aligning and orienting a probe, employed in an optical system of FIG. 1, in accordance to an embodiment of the present disclosure.

Now referring to FIG. 2, which illustrates a mechanism (100) disposed in the sensor head (202), for aligning and orienting the probe (101) in the optical system (200), at an angle on the surface (104) of the subject (105). As apparent from FIG. 2, the mechanism (100) may include at least one block member (103), which may be defined with a cavity (107) to accommodate the probe (101). The at least one block member (103) may be positioned within the one or more provisions (203), defined in the sensor head (202). In an embodiment, the at least one block member (103) may be movably disposed within the one or more provisions (203) in the sensor head (202). As an example, the block member (103) may tilt about a point (thus, pivotal movement), within the one or more provisions (203), during operation of the mechanism (100) i.e. the at least one block member (103) may tilt in a direction, corresponding to direction of orientation of the probe (101) on the surface (104) of the subject (105), during aligning of the probe (101) on the surface (104) of the subject (105). In an embodiment, the at least one block member (103) may be defined with any geometrical shapes such as but not limiting to stepped, cuboidal, conical, cylindrical, and the like.

In an illustrated embodiment, the probe (101), accommodated within the at least one block member (103) is positioned normal to the sensor head (202). However, the same may not be construed as a limitation, since the probe (101) may be positioned at any angle ranging from about 0 to 90 degrees with respect to the sensor head (202), without deviating from the scope of present disclosure.

In an embodiment, as the optical system (200) includes a plurality of probes (101), the angle of position of each of the plurality of probes (101), may be identical with respect to the sensor head (202) or the angle of position of each of the plurality of probes (101), may vary with respect to sensor head (202), without deviating from scope of the present disclosure.

Further, as seen in FIGS. 1 and 2, the mechanism (100) may include one or more deformable members (106). Each of the one or more deformable members (106) may facilitate in movably connecting the at least one block member (103) to a portion of the sensor head (202). As an example, one end of the one or more deformable members (106) may be connected to a first struts (108), configured at top portion of the sensor head (202), while another end of the one or more deformable members (106), may be connected to a second struts (109) configured in the at least one block member (103). In an embodiment, the one or more deformable members (106) facilitates tilting of the at least one block member (103) during aligning of the probe (101) on the surface (104) of the subject (105).

In an embodiment, the at least one block member (103) may be movably connected to the sensor head (202) by a hinge. The hinge may facilitate in movably connecting the at least one block member (103) and a side wall (204) of the one or more provisions (203) in the sensor head (202).

In an embodiment, the one or more deformable members (106) may be but not limiting to helical spring, coil spring, hydraulic spring, pneumatic spring or any other component that exhibit elastic properties.

Turning back to FIG. 2, the one or more provisions (203), defined in the sensor head (202) may include a side wall (204). The side wall (204), may be defined with geometrical shapes such as but not limiting to stepped, cuboidal, conical, cylindrical, and the like. The side wall (204) may be configured to exert lateral reaction force (W) on to the at least one block member (103), in order to restrict lateral and angular movement (thus, tilting) of the at least one block member (103), during operation of the mechanism (100). This facilitates in aligning the probe (101) at the desired angle on the surface (104) of the subject (105). In an embodiment, the side wall (204) facilitates in mitigating the chances of the probe (101) from slipping over the surface (104) of the subject (105) during alignment.

In an embodiment, geometrical shape of the at least one block member (103) may correspond to the geometrical shape of the side wall (204) of the one or more provisions (203), to facilitate firm engagement of the at least one block member (103) with the side wall (204) of the one or more protrusion, to align the probe (101) at desired angle on the surface (104) of the subject (105).

In an embodiment, a pair of deformable members (106) may be provided for connecting the at least one block member (103) and the portion of the sensor head (202) is an exemplary embodiment, and the same cannot be considered as a limitation, as a single deformable member may be used in the mechanism (100) to assist tilting of the at least one block member (103).

In an embodiment, the optical system (200) may be, such as but not limiting to reflectance spectroscopy system.

Figure 3:
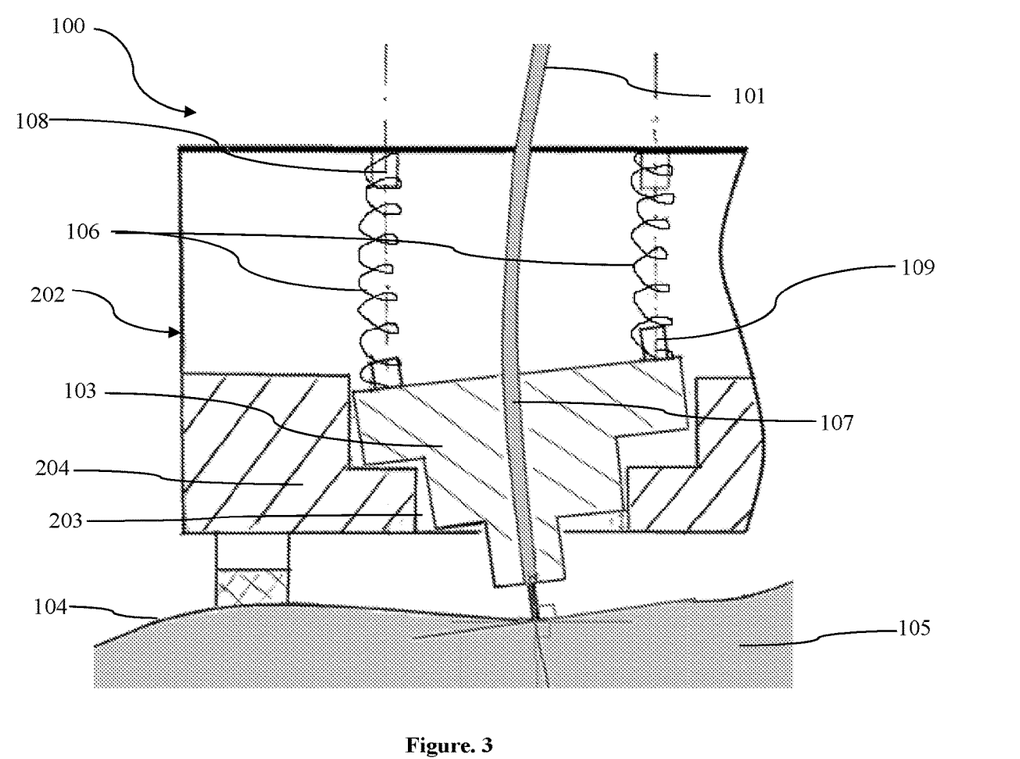
FIG. 3 illustrates the sectional view of the mechanism of FIG. 2, depicting alignment and orientation of the probe at a desired angle on a surface of the subject.
Figure 4:
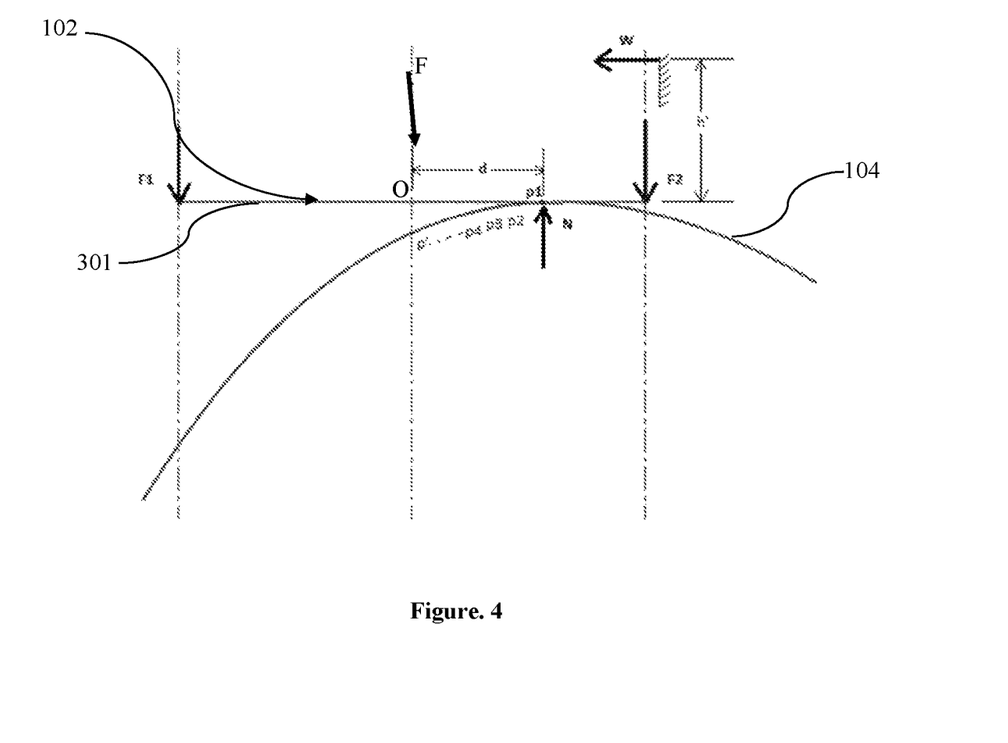
FIG. 4 illustrates magnified view of a tip of the probe contacting a surface of the subject.

Now, referring to FIG. 3, which illustrates operational embodiment of the mechanism (100), during aligning and orienting the tip (102) [best seen in FIG. 4] of the probe (101) at an angle on the surface (104) of the subject (105). During, operation of the optical system (200), the tip (102) of the probe (101) may be brought in contact with the surface (104) of the subject (105) to be analyzed, by applying force (F) to the probe (101). In an embodiment, tip (102) of the probe (101) may include at least one of a flat bottom profile [best seen in FIG. 4] and a disc profile (300) [best seen on FIG. 6]. In an embodiment, the mechanism (100) may be in ideal condition i.e. tilt angle of the at least one block member (103) and displacement of the one or more deformable members (106) may be zero (best seen in FIG. 2), until there exists no contact between the probe (101) and the surface (104) of the subject (105), or when the probe (101) contacts a plane surface (104) of the subject (105). However, when the probe (101) contacts the surface (104) of the subject (105), with irregularities such as convex, concave, combination of convex and concave, and the like, the mechanism (100) may facilitate in orienting and aligning the probe (101) at a desired angle on the surface (104) of the subject (105).

In an embodiment, the tip (102) of the probe (101) defined with at least one of a flat bottom profile and the disc profile may not be construed as a limitation, as tip (102) of the probe (101) may be defined with any of the geometrical shapes.

Now referring to FIG. 4, illustrates the probe tip (102) contacting an irregular (convex) region of the surface (104) of the subject (105). The probe tip (102) may contact the surface (104) at point P1. In an embodiment, the point of contact (P1) acts as a fulcrum and the tip (102) of the probe (101) acts as a lever. Due to the force (F) applied by the operator to the probe (101), a normal reaction force (N) may be generated at the point of contact (P1) of the probe (101), at a distance (d) from the axis of force (F), due to irregularities on the surface (104). Due to offset in the axis of direction of the force applied (F) and the normal reaction force (N), an angular moment may be induced at the center of the tip (102) of the probe (101), which is calculated by an equation (1)—

$$F*d$$

where, d being the distance between initial point of contact and the center of the tip (102).

Also, torque may be generated due to change in angular momentum and the torque at the center "O", may be calculated by the equation (1)—

$$T = F1(l/2) - F2(l/2) + (N*d) + (W*h') \quad (1)$$

where,

F1 and F2=forces exerted from one or more deformable members (106), l=length of the tip (102) of the probe (101), W=The resultant of all the forces or lateral reaction forces from side wall (204) of the one or more provisions (203) at a distance 'h' from the center (best seen in FIG. 4).

Figure 5:
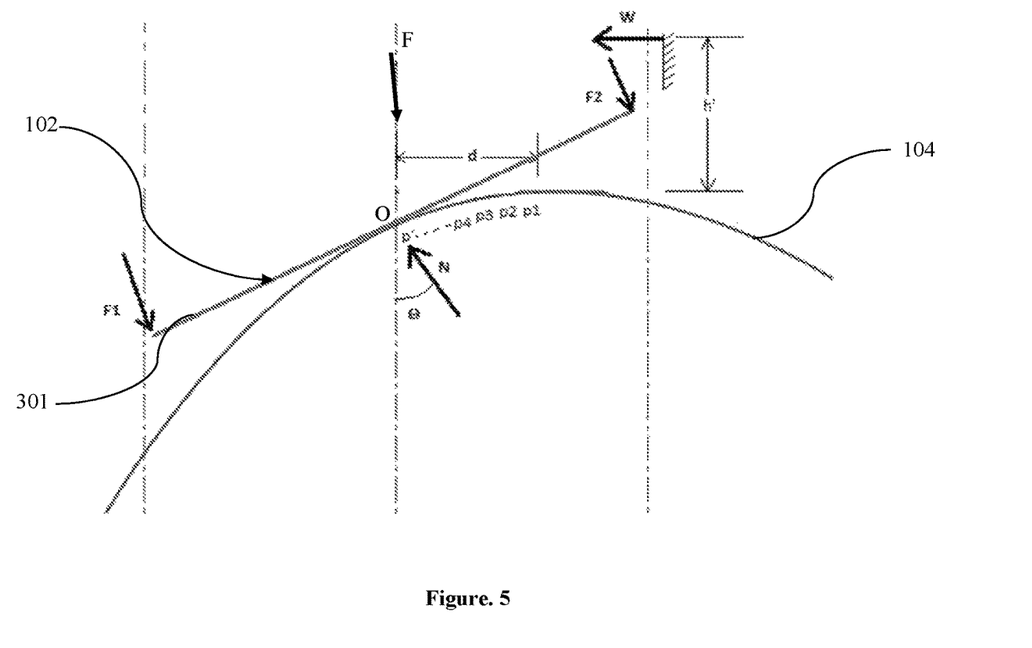
FIG. 5 illustrates magnified view of tip of the probe, oriented at an angle to the surface of the subject.

In order to counter the angular moment and torque generated at the tip (102) of the probe (101), it may orient or tilt by shifting the point of contact (P1) continuously in the form of rolling phenomenon on the surface (104) of the subject (105), assuming sufficient friction and perfect rolling without slipping. The contact point or fulcrum (P1) of the tip (102) of the probe (101) shifts continuously along the points P2, P3, P4 . . . [as seen in FIG. 5]. This shift in point of contact of the probe (101) i.e. orientation of the probe (101) (thus, tip (102) of the probe (101)), to counter the angular moment and torque, may result in tilting of the at least one block member (103), corresponding to orientation or tilting of the probe (101). As an example, if the probe (101) orients in clockwise direction to counter the angular moment and torque, the at least one block member (103) may also tilt in clockwise direction and vice-versa. Further, due to tilting of the at least one block member (103), the one or more deformable members (106) may undergo compression/expansion (as seen in FIG. 3), and thus may further assist in tilting of the at least one block member (103).

Further, as apparent from FIG. 3, the at least one block member (103) during tilting, may engage with a portion of the side wall (204) of the one or more provisions (203) defined in the sensor head (202). This engagement of the at least one block member (103) with the side wall (204) of the one or more provisions (203), may limit further tilting of the at least one block member (103). In an embodiment, limiting the tilting of the block member (103) may facilitate in limiting the orientation of the probe (101) on the surface (104) of the subject (105). As an example, the at least one block member (103) may restrict the shift in point of contact of the probe tip (102) beyond the point (P') i.e. the at least one block member (103) may restrict orientation of the probe (101) beyond contact point (P')[as seen on FIG. 5]. Thus, the at least one block member (103) may facilitates in aligning the probe (101) at desired angle on the surface (104) of the subject (105). Aligning the probe (101) at desired angle on the surface (104) of the subject (105) may result in hermetic contact of the probe (101) with the surface (110) of the subject (105) and thus negating Fresnel losses, which aids in improving the effectiveness of the optical system (200).

In an embodiment, at the contact position (P') on the surface (104) of the subject (105), the probe (101) (thus, tip (102)), may be normal to the surface (104) of the subject (105). At this moment, torque=0 and hence, d=0 substituting values of T and d in equation (1), we obtain $$F1(l/2) - F2(l/2) = W(h')$$

also, compression in one or more deformable members may be considered as x and y respectively.

so, $F1 = kx$ and $F2 = ky$ substituting the same in equations, we derive $$(k1(x-y))/2 = W(h')$$

Further, on equating vertical and horizontal forces,
vertical forces: F1+F2=N cos θ

$$N = (F1 + F2)/\cos\theta$$
$$= k(x + y)/\cos\theta$$

Horizontal forces: N sin θ=W

In an embodiment, the desired angle at which the probe (101) to be aligned on the surface (104) of the subject (105) may be achieved by adjusting a clearance between the at least one block member (103) and the side wall (204) of the one or provisions (203), based on the subject (105) to be analyzed. That is, the clearance between the side wall (204) of the one or more provisions (203) and the at least one block member (103) may determine alignment of the probe (101) on the surface (104) of the subject (105).

In an embodiment, the mechanism (100) for aligning and orienting the probe at an angle to the surface (104) of the subject (105) may not be construed as a limitation, as the mechanism may facilitate in aligning and orienting the probe (101) at a range of angles to the surface (104) of the subject (105).

In an embodiment, the mechanism (100) may be employed in a system, which includes emission of matter or energy, which may be directed at the surface (104) of the subject (105) at an angle or range of angles.

Figure 6:
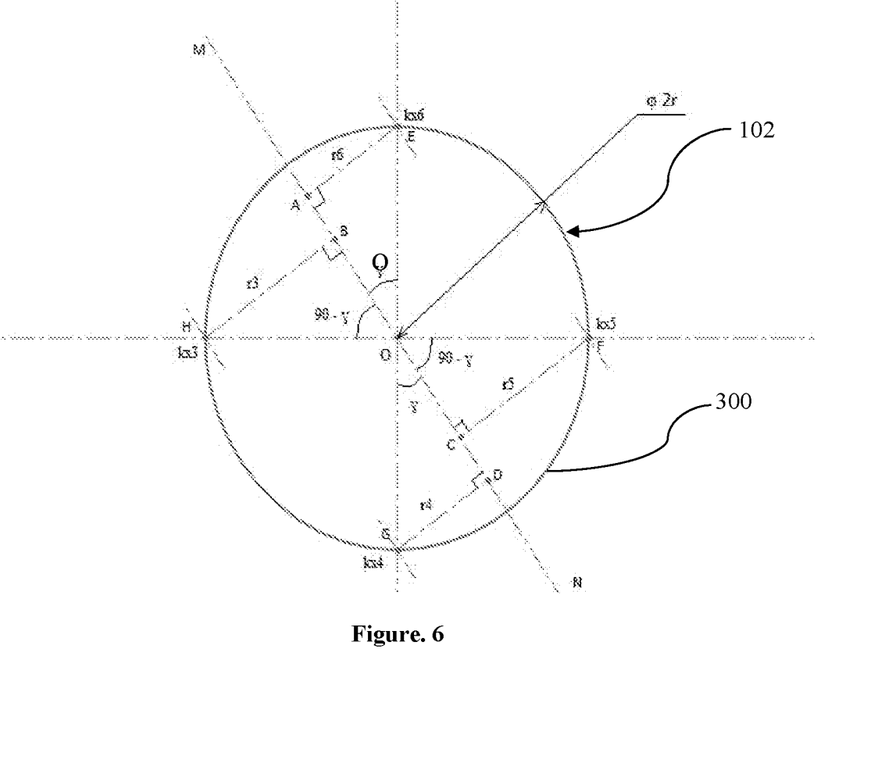
FIG. 6 illustrates a schematic view of a disc profile of the tip of the probe, in accordance with another embodiment of the present disclosure.

Now referring to FIG. 6, which illustrates the tip (102) of the probe (101) having a disc or nib shaped profile (300), in accordance to another embodiment of the present disclosure. During encounter of irregularities on the surface (104) of the subject (105), the tip (102) of the probe (101) with the disc profile (300) has to be tilted in more than one dimensions i.e. in x, y and z dimensions to make the center (O) of tip (102) of the probe (101) perpendicular to the surface (110) of the subject (105), for effective analysis. In an embodiment, a plurality of deformable members but not limiting to four deformable members (S3, S4, S5 and S6) (not shown in figures) having same spring constant "k" and made of same material may be adapted in the mechanism (100). Due to the force applied by the operator, the deformable members (S3, S4, S5 and S6) tend to compress, in order to oppose the force applied. As an example, compression of each individual deformable members (S3, S4, S5 and S6) may be considered as x3, x4, x5 and x6 respectively. At an instance, where the tip (102) of the probe (101) contacts the surface (104) of the subject (105), angular moment may be induced and angular moment at the center "O" about the axis, may be calculated by the equation (1)—

$$kx3r3+kx4r4-kx5r5-kx6r6=0 \text{(Final state of equilibrium)}$$

Further, by considering the angle of tilt of the axis of the disc profiled (300) probe tip (102) to be "γ" and by adapting following mathematical formulation method, In triangle $OAE$, $\sin\gamma = r6/r$ $r6 = r \sin\gamma$ similarly, we obtain, $r3 = r \cos\gamma$, $r4 = r \sin\gamma$, $r5 = r \cos\gamma$, $r6 = r \sin\gamma$ Substituting the values of r3, r4, r5 and r6 in the above equation (1), we obtain the equation (1):

$$x3 \cos\gamma + x4 \sin\gamma - x5 \cos\gamma - x6 \sin\gamma = 0$$

In an embodiment, by determining the value of force applied and angle of force applied, the resultant tilt may be obtained with the aid of the above-mentioned equations.

In an embodiment, the mechanism (100) assists in automatically aligning and orienting the tip (102) of the probe (101) at desired angle on the surface (104) of the subject (105), irrespective of the angle of force applied, during encounter of irregularities on the surface (104) of the subject (105).

In an embodiment, the mechanism (100) of the present disclosure is associated with each of the plurality of probes (101) in the optical system (200), for aligning and orienting the plurality of probes, which may contact the surface (104) of the subject (105) at different angles to the surface of the subject (105).

In an embodiment, the mechanism (100) may be defined as a system whose deformity is by virtue of the property of the material or design of the mechanism.

In an embodiment, a plurality of actuators such as hydraulic or pneumatic actuators may be used to assist the tilt of the at least one block member (103), to position the tip (102) of the probe (101) at a desired angle on the surface (104) of the subject (105).

It is to be noted that use of the mechanism (100) for aligning and orienting probes (101) in the optical system (200) is an exemplary embodiment, and the same may be adapted to align components in systems or applications such as but not limiting to bio-medical devices, 3-D printing, clothing, painting and the like, without deviating from the scope of the present disclosure.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERICALS

| Numerical | Particulars |
| --- | --- |
| 100 | Mechanism |
| 101 | Probe |
| 102 | Probe tip |
| 103 | Block member |
| 104 | Surface |
| 105 | Subject |
| 106 | Deformable member |
| 107 | Cavity in a block member |
| 108 | First struts |
| 109 | Second struts |
| 200 | Optical system |
| 201 | Enclosure |
| 202 | Sensor head |
| 203 | One or more provision |
| 204 | Side wall |
| 300 | Disc profile of the tip of the probe |
| 301 | Flat profile of the tip of the probe |

The invention claimed is:

1. A mechanism for aligning a probe of an optical system, on a surface of a subject, the mechanism comprising:
a sensor head, defining one or more provisions;
at least one block member, movably disposed in each of the one or more provisions, wherein the at least one block member is defined with a cavity to accommodate the probe and movably connected to the sensor head by at least one of one or more deformable members and a hinge;
each of the one or more deformable members including a first end connected to the block member and a second end connected to a portion of the sensor head;
wherein, contact of the probe with the surface of the subject, generates a torque, for aligning the probe on the surface of the subject, and
wherein the at least one block member is configured to tilt based on movement of the probe with assistance from the one or more deformable members, to facilitate in aligning the probe at an angle with respect to the surface and establish hermetic contact between the probe and the surface of the subject.

2. The mechanism as claimed in claim 1, wherein the one or more deformable members is connected between the at least one block member and a portion of the sensor head.

3. The mechanism as claimed in claim 1, wherein the hinge is connected between a side wall of the one or more provisions, and the at least one block member.

4. The mechanism as claimed in claim 1, wherein the one or more deformable members, is at least one of a helical spring, coil spring, hydraulic spring and pneumatic spring.

5. The mechanism as claimed in claim 1, wherein the probe accommodated within the at least one block member is positioned at an angle to the sensor head.

6. The mechanism as claimed in claim 5, wherein the angle of the probe with the sensor head ranges from about 0 degrees to 90 degrees.

7. The mechanism as claimed in claim 5, wherein the probe accommodated within the at least one block member is positioned normal to the sensor head.

8. The mechanism as claimed in claim 1, wherein a tip of the probe is defined with at least one of a flat profile and a disc profile.

9. The mechanism as claimed in claim 1, wherein side wall of the one or more provisions are configured to exert lateral reaction forces to the at least one block member, for restricting lateral and angular movement of the at least one block member, to limit angle of tilt of the probe on the surface of the subject.

10. The mechanism as claimed in claim 1, wherein geometrical shape of the side wall of the one or more provisions is at least one of stepped, cubical, conical, frustum and cuboidal shape.

11. The mechanism as claimed in claim 1, wherein geometrical shape of the at least one block member corresponds to the geometrical shape of the side wall.

12. An optical system, the system comprising:
an enclosure;
a sensor head coupled to the enclosure;
a plurality of probes positioned within the enclosure, wherein each of the plurality of probes are aligned on a surface of a subject at an angle, by a mechanism disposed in the sensor head, the mechanism comprising:
at least one block member, movably disposed in each of the one or more provisions, the at least one block member accommodates the probe and is movably connected to the sensor head by at least one of one or more deformable members and a hinge;
each of the one or more deformable members including a first end connected to the block member and a second end connected to a portion of the sensor head;
wherein, contact of the probe with the surface of the subject, generates a torque, for aligning the probe on the surface of the subject, and wherein the at least one block member is configured to tilt based on movement of the probe with assistance from the one or more deformable members, to facilitate in aligning the probe at a desired angle with respect to the surface and establish hermetic contact between the probe and the surface of the subject.

\* \* \* \* \*